United States Patent [19]

Yoshida et al.

[11] Patent Number: 4,507,179

[45] Date of Patent: Mar. 26, 1985

[54] PROCESS OF PRODUCING ALUMINUM SUBSTRATE FOR MAGNETIC RECORDING MEDIA

[75] Inventors: Koichi Yoshida; Yoshio Hirayama; Yasuo Oka; Takashi Kajiyama, all of Shizuoka, Japan

[73] Assignee: Nippon Light Metal Company Limited, Tokyo, Japan

[21] Appl. No.: 584,995

[22] Filed: Mar. 1, 1984

[51] Int. Cl.$^3$ .................... C25D 11/08; C25D 11/10
[52] U.S. Cl. ........................................................ 204/58
[58] Field of Search ........................................ 204/58

[56] References Cited

FOREIGN PATENT DOCUMENTS

| 166800 | 5/1984 | Switzerland | 204/58 |
| 1185346 | 3/1970 | United Kingdom | 204/58 |
| 1464857 | 2/1977 | United Kingdom | 204/58 |

OTHER PUBLICATIONS

Surface Treatment of Al by Wernick et al., Robert Drager Ltd., 1964, p. 351.

Primary Examiner—R. L. Andrews
Attorney, Agent, or Firm—William J. Daniel

[57] ABSTRACT

An aluminum substrate suitable for making high-density magnetic recording media is produced by anodizing a surface of the aluminum substrate in an aqueous chromic acid solution at an electrolytic voltage higher than 60 volts. The anodic film thus formed has no black spot defects and also exhibits no cracks when the substrate is heated at a high temperature for forming a magnetic recording layer.

The effect is further improved by adding a small amount of oxalic acid to the electrolyte.

6 Claims, No Drawings

PROCESS OF PRODUCING ALUMINUM SUBSTRATE FOR MAGNETIC RECORDING MEDIA

BACKGROUND OF THE INVENTION

1. Field of the Invention

This invention relates to a process of producing an aluminum substrate for making magnetic recording media, such substrate having an anodically oxidized film or layer on the surface thereof. More particularly, the invention relates to a process of producing an aluminum substrate for making high-density magnetic recording media, such substrate having substantially no black spot defect and having excellent smoothness and heat resistance.

2. Description of the Prior Arts

Recently, there has been much demand for increased recording density of magnetic recording media, such as magnetic disk, etc. For responding to such demand, it is necessary to reduce thickness of the magnetic medium layer to be formed on a surface of the substrate and the spacing between the magnetic head and the magnetic medium. The substrate of such magnetic recording media must exhibit superior surface properties with respect to smoothness, and hardness.

As a substrate for making high-density magnetic recording media as above-mentioned, an aluminum substrate having an anodic oxide film on its surface has been used.

Aluminum substrate having such an anodic oxide film is desirable because the anodic oxide film formed on the surface of aluminum is hard and excellent in wear resistance, has good polishability, whereby a smooth surface in high accuracy can be easily obtained, and a thin magnetic layer can easily formed on its surface.

Hitherto, for easily forming an anodic oxide film having suitable hardness for making magnetic recording media on an aluminum substrate, commonly an electrolytic treatment using a sulfuric acid solution has been performed as disclosed in the British Pat. No. 1,493,160 of Nov. 23, 1977. However, the aluminum substrate having formed thereon an anodic oxide film using a sulfuric acid solution (hereinafter, is referred to as a sulfuric acid anodic oxide film) has the faults as described hereinafter and these faults are handicaps to increasing the recording density of a magnetic recording media.

One of these faults is a so-called black spot defect. Impurities such as iron, silicon, etc., present in aluminum or an aluminum alloy crystallize as intermetallic compounds, which exist at the surface of aluminum or the alluminum alloy as microscopic spots. Such microscopic spots do not form anodic film properly during electrolytic treatment. The spots are, at the beginning, very fine, i.e. of sub-micron order, but become larger with the growth of the anodic oxide film and show pit-like fine defects of 5 to 10 $\mu m$ in diameter on a sulfuric acid anodic oxide film having a thickness greater than 5 $\mu m$ or more. If a substrate has many of these defects, the signal error in the magnetic recording medium is large and hence the existence of the defect is undesirable.

Another one of the faults is thermal cracking. In the case of an aluminum substrate for high-density magnetic recording medium, it is required to apply $\alpha$-$Fe_2O_3$ to the surface of the aluminum substrate by sputtering or vapor deposition, followed by heating to 300°-400° C. for forming $\gamma$-$Fe_2O_3$ but when the aluminum substrate is heated to such a high temperature, the sulfuric acid anodic film formed on the substrate is cracked, whereby inferior products are liable to result. Accordingly, the thickness of the anodic oxide film must be reduced to as thin as 1 to 3 $\mu m$, which results in reducing the head crash resistance of the aluminium substrate and hence the occurence of cracking is undesirable.

As the result of investigation on improving an aluminum substrate having anodic oxide film, the inventors have discovered that when an aqueous chromatic acid solution is used for the formation of the anodic oxide film on an aluminum substrate and electrolysis is performed at a constant voltage method higher than the voltage employed for conventional chromic acid electrolysis, an aluminum substrate free of black spot defects and thermal cracking can be produced.

Also, it has been discovered that when forming the anodic oxide film over 10 $\mu m$ in thickness on an aluminum using the foregoing chromic acid process, a hardness of thus formed film becomes about or over 300 Hv in Vickers hardness, which is required for head crush resistance and scratch resistance in this kind of aluminum substrate.

SUMMARY OF THE INVENTION

A primary object of this invention is to provide a process of producing an aluminum substrate for a magnetic recording medium having formed thereon an anodic oxide film which is hard, is excellent in heat resistance, and has practically no black spot defects.

Other object of this invention is to provide an aluminum substrate for a high-density magnetic recording medium.

Other objects and advantages of this invention will become apparent from the following detailed explanation.

According to this invention, there is provided a process of producing an aluminum substrate for a magnetic recording medium which comprises electrolytically treating an aluminum material with a solution containing 1.5 to 15% at weight chromic acid as the electrolyte by a constant voltage higher than 60 volts.

DETAILED DESCRIPTION OF THE INVENTION

An aluminum material used for the substrate in this invention is high-purity aluminum such as aluminum having a purity higher than 99.9% or an alloy composed of the foregoing high-purity aluminum as a base metal containing 2 to 6% by weight magnesium. When high-purity aluminum is used as the aluminum material, the aluminum may be lined with an aluminum alloy or a rigid non-magnetic material such as a hard resin for imparting strength to the substrate.

Such an aluminum material is formed into a disc or other any desired form and after smoothening the surface thereof by grinding or polishing, an anodic oxidizing treatment is applied onto the surface of the aluminum material using a chromic acid-containing electrolyte.

In this invention, the concentration of an aqueous chromic acid solution used as the electrolyte is 1.5 to 15% preferably 2–5%, the temperature of the electrolyte is 30° to 50° C. preferably 33° to 42° C., and the current density is 0.1 to 0.8 amp./$dm^2$ preferably 0.25–0.65 amp./$dm^2$, which conditions for this invention are almost same as the conditions in a conventional constant voltage chromic acid anodic oxidizing treatment called the "Buzzard process". However, the electrolytic voltage in this invention is higher than the standard electrolytic voltage of 40 volts in the Buzzard process and is higher than 60 volts, preferably 75 to 100 volts.

In addition, by adding oxalic acid to the electrolyte in an amount not over 1/5 of the amount of chromic acid in the electrolyte, the current density is increased and the film-forming speed and/or the hardness of film can be increased without reducing other effects of this invention. If the concentration of oxalic acid in the electrolyte is over 1/5 of the amount of chromic acid, the thermal cracking resistance of the film formed is reduced and the black spot defect is liable to occur.

Also, if the amount of aluminum ions present in the electrolyte increases over a certain limit during the electrolysis of this invention, the current density suddenly decreases to reduce the heat resistance and the hardness of the film formed on the aluminum material. Accordingly, it is desirable to keep the concentration of aluminum ions in the electrolyte below 1/20 of that of chromic acid during the electrolysis.

The aluminum substrate thus obtained has such excellent features suitable for high recording density magnetic recording media in that there is practically no formation of fine black spot defects in the aluminum substrate, when the thickness of the film is over 10 $\mu$m the hardness of the aluminum substrate is as good as or higher than that of the aluminum substrate treated by a conventional sulfuric acid process anodic oxidation, whereby the aluminum substrate of this invention is excellent in polishability and scratch resistance, and when the aluminum plate treated in this invention is maintained at 300° to 400° C. for forming a magnetic layer on its surface, fine cracks do not develop owing to the excellent heat resistance of the anodized aluminum substrate. The improved properties of aluminum substrates anodized according to this invention are shown by the following comparative experiments.

Aluminum-magnesium alloy sheets (Al-3% Mg) prepared using high-purity aluminum of 99.99% were subjected to an electrolytic treatment in an aqueous 5% chromic acid solution maintained at 35° C. by a constant D.C. voltage process and the black spot formation on the treated aluminum substrates at each electrolytic voltage was checked, the result being shown in Table 1. Also, the same specimens were heated to 350° C. for 2 hours, and examined for the formation of fine cracks and the result is shown in Table 1 together with the hardness of the film formed on the sheets as indicated by the scratch resistance and the headcrash resistance.

Also, for the sake of comparison, the same evaluation tests as above were applied to an aluminum alloy having the same composition as used in the foregoing tests but subjected to a conventional sulfuric acid anodic oxidation process (15% $H_2SO_4$ solution, bath temperature of 20° C., constant voltage process at 10 volts) and the evaluation results are also shown in the same table.

In these tests, the anodic film thickness of the specimens prepared by this invention was 12 $\mu$m and that of the specimens by the conventional process was 6 $\mu$m.

In the evaluation of black spot shown in Table 1, 0 signifies that no or one black spot smaller than 2.5 $\mu$m is observed in the microscopic range of field (0.36 mm$^2$), and $\Delta$ signifies no or one black spot smaller than 3.5 $\mu$m in the range above mentioned, while X means the presence of more or larger black spots.

Also, the evaluation of the formation of fine cracks was made by microscopic observation of the surface of the aluminum substrate after the application of the foregoing heat treatment. In the evaluation shown in Table 1, 0, $\Delta$ and X signify no cracking, partial cracking and overall cracking respectively.

The evaluation of hardness was made using a micro Vickers hardness tester (load 15 g).

TABLE 1

| Voltage (volt) | Black spot | Crack | Hardness Hv |
|---|---|---|---|
| 40 | $\Delta$ | X | 183 |
| 60 | $\Delta$ | $\Delta$ | 252 |
| 80 | O | O | 313 |
| 100 | O | O | 260 |
| 120 | $\Delta$ | O | 225 |
| Conventional process | X | X . | 290 |

Also, aluminum alloy specimens each having the same composition as the aluminum alloy used in the foregoing tests were subjected to an anodical oxidation treatment using an aqueous chromic acid solution having the same temperature and concentration as those in the foregoing tests at a constant D.C. voltage process of 75 volts to form anodic oxidized films having different thicknesses, respectively and checked for the formation of black spot, the results being shown in Table 2.

Then, the aluminum alloy specimens were maintained at 300° C., 350° C., or 400° C. for 2 hours and examined for cracks in each case. The results are also shown in Table 2.

The evaluation modes of the black spot and the hardness are same as in the foregoing tests shown in Table 1.

TABLE 2

| Film thickness ($\mu$m) | Crack 300° C. | 350° C. | 400° C. | Black spot | Hardness Hv |
|---|---|---|---|---|---|
| 3 | O | O | O | O | 165 |
| 6 | O | O | O | O | 245 |
| 10 | O | O | O | O | 298 |
| 13 | O | O | O | O | 325 |
| 15 | O | O | O | O | 315 |
| 18 | O | O | $\Delta$ | O | 302 |
| 20 | $\Delta$ | $\Delta$ | X | — | 285 |

From the results shown in Table 1 and Table 2, the following conclusions can be drawn.

For the aluminum substrates treated by the process of this invention, i.e., subjected to electrolytic treatment using an aqueous chromic acid solution by a constant D.C. voltage process at an electrolytic voltage higher than 60 volts, no or almost no black spot is observed, cracks are not formed during heating for forming a magnetic layer when the thickness of the film is less than about 18 $\mu$m, and the aluminum substrate satisfies the hardness required for a substrate of this kind when the film thickness is more than 10 $\mu$m. On the other hand, for the aluminum substrate subjected to the electrolytic treatment using an aqueous sulfuric acid solution by a conventional typical anodic oxidation treatment or the aluminum substrate subjected to the electrolytic treatment using an aqueous chromic acid solution under conventional conditions, i.e., at a voltage about 40 volts, the results are distinctly inferior for at least black spots and cracking.

Next, an aluminum-magnesium alloy substrate having the same composition as that used in the foregoing tests was subjected to an electrolytic treatment in each of several electrolytic baths of an aqueous 5% chromic acid solution containing different amount of oxalic acid at a constant voltage of 90 volts while varying the bath temperature, and the current density (amp./dm$^2$) and the Vickers hardness Hv (load: 20 g) were measured in each case. The results thus obtained are shown in Table 3. In addition, the thickness of the film formed on the aluminum plate was 13 μm in each case.

TABLE 3

| Content of oxalic acid (%) | Bath temperature (°C.) | | | | | |
|---|---|---|---|---|---|---|
| | 30 | | 35 | | 40 | |
| | C.D.* | Hardness | C.D. | Hardness | C.D. | Hardness |
| 0 | 0.25 | 280 | 0.43 | 339 | 0.60 | 278 |
| 0.1 | 0.28 | 296 | 0.44 | 350 | 0.62 | 298 |
| 0.5 | 0.29 | 300 | 0.46 | 356 | 0.64 | 321 |

*C.D.: Current density

As shown in the results of the above table, it can be concluded that when using an aqueous chromic acid solution alone, the film formed on the aluminum tends to be softened when the bath temperature is increased but the hardness of the film can be increased even at a high temperature by adding a small amount of oxalic acid to the electrolyte whereas by using an aqueous chromic acid solution containing an oxalic acid, a film having almost the same hardness as obtained using a chromic acid solution can be obtained at a higher bath temperature than that in the foregoing electrolytic treatment, so that the current density can be increased and the treatment time can be shortened.

As described above, by the process of this invention, the worst problems encountered in using aluminum substrates for magnetic recording media, i.e., the formation of black spots, the formation of cracks upon high-temperature treatment, and reduction in headcrash resistance and scratch resistance can be solved altogether.

Then, the practical execution of the process of this invention will be further illustrated by the following examples.

EXAMPLE 1

After subjecting a disk (inside diameter of 75 mm, outside diameter of 200 mm, and thickness of 2 mm) of an aluminum alloy (Al-3% Mg) prepared using aluminum of 99.99% in purity to an appropriate surface polishing, the disk was rinsed in a non-etching degreasing agent and then subjected to an anodic oxidation treatment. Thus, the foregoing aluminum alloy disk was immersed in an aqueous 3.5% chromic acid solution maintained at 35° C. and an electrolytic treatment was performed by passing direct current using the aluminum alloy disk as the anode at a constant voltage of 80 volts. By continuing the electrolysis for about 60 minutes at a current density of 0.45 amp./dm$^2$, an aluminum substrate having an opaque and smooth anodic film of 12 μm in thickness was obtained.

During the electrolysis the concentration of aluminum ions was kept under 2 g/l.

Then, the disk substrate was polished with a grind medium consisting of fine alumina powder (−3 μm).

The surface roughness of polished substrate was 0.01 μm (Rmax.)

After polishing its disk substrate, the hardness was measured by means of a micro-Vickers hardness tester (load: 15 g). The hardness was 308 Hv.

When the surface of the disk substrate was examined with a microscope, no black spot defect was observed.

Also, when the substrate was further heated to 350° C. for 2 hours, no cracks were observed on the surface.

EXAMPLE 2

After subjecting a disk substrate (inside diameter pf 75 mm, outside diameter of 200 mm, and thickness of 2 mm) of an aluminum alloy (Al-4% Mg) prepared using aluminum of 99.99% in purity to an appropriate surface polishing, the aluminum disk substrate was immersed in an aqueous 5% chromic acid solution of 35° C. containing 1% oxalic acid and an electrolytic treatment was performed at a constant D.C. voltage of 100 volts using the disk as the anode to form an opaque and smooth anodic film of 12 μm in thickness. The current density in the electrolytic treatment was 0.45 amp./dm$^2$ and the treatment time was 45 minutes. Throughout the electrolysis the concentration of aluminum ion was kept under 2 g/l.

The Vickers hardness (load: 15 g) of the resultant substrate after polishing was 351 Hv and when the surface of the disck substrate was examined with a microscope, no black spot defect was observed. Also, when the substrate was further heated to 350° C. for 2 hours, no cracks were observed on the surface.

We claim:

1. A process of producing an aluminum substrate for magnetic recording media, which comprises subjecting an aluminum material to an electrolytic treatment by a constant voltage process at an electrolytic voltage higher than 60 volts using an aqueous solution of 1.5 to 15% by weight chromic acid as the electrolyte at an operating temperature of 30°–50° C.

2. The process of producing an aluminum substrate for magnetic recording media as claimed in claim 1, wherein the electrolytic treatment is performed by a constant voltage process at a voltage of 70 volts to 100 volts.

3. The process of producing an aluminum substrate for magnetic recording media as claimed in claim 1, wherein the aluminum material is high-purity aluminum having purity of higher than 99.9% or an alloy of 94-98% by weight of said high-purity aluminum and 2 to 6% by weight of magnesium.

4. The process of producing an aluminum substrate for magnetic recording media as claimed in claim 1, wherein the electrolyte further contains oxalic acid in an amount not over 1/5 of the concentration of chromic acid in the electrolyte.

5. The process of producing an aluminum substrate for magnetic recording media as claimed in claim 1, wherein the electrolytic treatment is performed while keeping the concentration of aluminum ions in the electrolyte below 1/20 of that of chromic acid.

6. The process of producing an aluminum substrate for magnetic recording media as claimed in claim 1, wherein the thickness of the anodic oxide film formed by the electrolysis is from 10 μm to 18 μm.

* * * * *

UNITED STATES PATENT AND TRADEMARK OFFICE
CERTIFICATE OF CORRECTION

PATENT NO. : 4,507,179
DATED      : March 26, 1985
INVENTOR(S): Koichi Yoshida et al It is certified that error appears in the above-identified patent and that said Letters Patent is hereby corrected as shown below:

The following should appear in the heading of the above-identified patent:

-- [30]   Foreign Application Priority Data

Mar. 18, 1983 [JP]    Japan ........... 58-44364 --.

Signed and Sealed this

Eighteenth Day of June 1985

[SEAL]

Attest:

DONALD J. QUIGG

Attesting Officer     Acting Commissioner of Patents and Trademarks